United States Patent Office 2,905,556

Patented Sept. 22, 1959

2,905,556

PHOTOSENSITIVE COMPOSITION OF MATTER AND METHOD OF MAKING SAME

Charles H. Fuchsman, University Heights, Lawrence I. Charnas, Shaker Heights, and Stanley B. Elliott, Bedford, Ohio, assignors to Ferro Corporation, Cleveland, Ohio, a corporation of Ohio No Drawing. Application August 19, 1957
Serial No. 679,106

14 Claims. (Cl. 96—27)

This invention relates as indicated to a new composition of matter and has more particular reference to photosensitive materials and method of making same.

It is well known to those skilled in the art that the formation of images in photosensitive compositions is dependent upon the degeneration of silver salts therein. In the photosensitive systems of the present invention the formation of images is not dependent upon the degeneration of silver salts, but is dependent upon the degradation of materials which in the presence of Friedel-Crafts catalysts are degraded by the action of heat and/or light so as to form unsaturated structures rather than reverting to their monomeric form.

These systems are characterized by their ability, after being exposed to actinic light, of being "developed" and "fixed" solely by heat, entirely without the use of any additional chemical reagents. United States Patents 2,789,053; 2,789,052 and 2,722,158 will be found to be illustrative of such photosensitive systems.

A principal object of the present invention is to provide a new photosensitive composition of matter which on subsequent "developing" and "fixing" by heat alone produces a light-stable image which has a degree of permanence heretofore unattained by the prior art compositions.

Other objects will appear as the description proceeds.

To the accomplishment of the foregoing and related ends the invention then comprises the features hereinafter fully described and pointed out in the claims, the following description setting forth in detail certain illustrative embodiments of the invention, these being indicative, however, of but a few ways in which the principle of the invention may be employed.

Broadly stated this invention comprises a photosensitive composition of matter comprising an intimate admixture of:

(*a*) At least one material selected from the class consisting of halogenated vinyl resins; halogen free vinyl resins plus a material having high light instability and a boiling point not less than 150° F. selected from the class consisting of saturated aliphatic branch-chain halogenated hydrocarbons, halogenated long chain aliphatic carboxylic acids, esters of long chain aliphatic halogenated carboxylic acids, halogen containing aromatic aldehydes, halogen containing olefins and halogenated styrene compounds; and halogen free cellulose resins plus a material having high light instability and a boiling point not less than 150° F. selected from the class consisting of saturated aliphatic branch-chain halogenated hydrocarbons, halogenated long chain aliphatic carboxylic acids, esters of long chain aliphatic halogenated carboxylic acids, halogen containing aromatic aldehydes, halogen containing olefins and halogenated styrene compounds;

(*b*) A minor amount of a compound of zinc;

(*c*) A minor amount of a hydroxyl and amino-free material selected from the class consisting of unsaturated cyclic diketones and alkyl substituted unsaturated cyclic diketones; and (*d*) A minor amount of a light stabilizer, said stabilizer comprising in combination a trivalent cerium compound and resorcinol monobenzoate.

Since the compositions and processes of the present invention are different from those ordinarily encountered by persons skilled in the art of photosensitive materials the following definitions are offered so as to avoid any confusion that might arise:

Exposure: The treatment of the photosensitive composition under an actinic light source to produce a latent image.

Latent image: The area exposed to an actinic light source. The latent image may either be visible or invisible.

Development: The heat treatment of the latent image so as to make an invisible latent image apparent or to intensify a visible latent image.

Image: The visible area exposed to actinic light and then developed by heat.

Ground: The undeveloped area around the image.

Actinic light: The term actinic light as used in the present invention is meant to include any electro-magnetic wave in the range of X-ray up to infra-red.

In the foregoing broad statement basic component (*a*) of the present composition is intended to comprise any organic compound or compounds which under Friedel-Crafts conditions will undergo chemical change to produce a change of color.

According to modern views, the color of organic compounds are usually associated with the presence in the molecule of a long chain or network of atoms, predominantly carbon linked by alternate single and double bonds and forming a so-called conjugated chain or network. For intense colors, the sequence of linkages in such a chain should be readily reversible according to the scheme:

—C=C—C=C—C=C—⇄=C—C=C—C=C—C=

The group —C=C— is known as vinylene, and hence, the chromophoric chain may be made up of *n* number of vinylene groups.

In other words the present invention is dependent upon the color change produced in organic materials capable of forming sufficient conjugated double bonds to form visible color bodies or the color change produced by the condensing, chelating, degrading or other means of complexing organic compounds with existing conjugated double bonds.

In light of the foregoing component (*a*) may be a halogenated resin capable of degradation with the formation of sufficient conjugated double bonds to form visible color bodies. Thus the following resins may be used in the present invention:

Vinyl chloride polymers
Vinylidene chloride polymers
Vinyl chloride-vinylidene chloride copolymers
Vinyl chloride-vinyl acetate copolymers
Vinylidene chloride-vinyl acetate copolymers These compounds, which for practical purposes are polymers, must contain a straight-chain of at least 10 carbon atoms so that on degradation the molecule will contain at least 5 and preferably 10 or more conjugated double bonds. This requirement is met admirably by the vinyl chloride polymers and copolymers referred to above as well as halogenated polyethylene.

Or if desired component (*a*) may be any non-halogenated polymeric material which in the presence of zinc chloride under the influence of light and/or heat is able to undergo degradation with the formation of chromophore groups. We have found that any polymeric material which does not revert to its monomeric form can be degraded by the present process to produce a change of color.

Thus the following broad classes of polymeric materials are typical of the substances which are applicable to the present invention:

| | |
|---|---|
| Polyvinyl acetate | Alkyd resins |
| Polyvinyl alcohol | Polyamides |
| Ethyl cellulose | Polyacrylonitrile |
| Cellulose acetate | Cellulose (paper and cloth) |

Low molecular weight polymers, although they may not have film forming properties may be employed if absorbed into absorbent bodies such as wood, paper, fabric, etc. It is to be noted that the various genera of polymeric materials which fall under the above broad classes are meant to be included as materials which are applicable to the present invention.

If the component (*a*) is other than a halogenated resin it is necessary to add a halogenated material having a boiling point not less than 150° F. which is unstable in actinic light and which degrades to release halogen ions.

Thus compounds which in actinic light are highly unstable readily releasing halogen ions may be used as the source of halogen ions for conversion of a compound of zinc to zinc chloride.

The following materials are illustrative of the type of organic compounds which readily release their halogen ions when exposed to actinic light and are thus particularly useful in the present invention:

| | |
|---|---|
| Chlorinated paraffins | Hexachloroethane |
| Chlorinated rubber | Trichloroethane |
| Alpha chlorostyrene | Octachloropropane |
| Beta chlorostyrene | Alphchlor acrylic acid |
| Parachlor benzaldehyde | Halogenated vegetable oils |
| Dichloropropylene | Halogenated fatty acids |

If component (*a*) is a non-halogenated polymeric material then the halogenated material will be used with such polymeric material in the ratio of from about 0.1 part per 20 parts of polymeric material to 20 parts per 20 parts of polymeric material.

In the broad statement of the invention, component (*b*) is zinc chloride or a compound of zinc which reacts with one of the foregoing halogenated materials to form zinc chloride and which in the presence of light and/or heat causes the compound (*a*) to undergo chemical change. The materials which are used for this purpose are not required in stoichiometric amounts to combine with component (*a*), consequently component (*b*) serves catalytically to promote the chemical change in component (*a*).

The following zinc compounds are illustrative of materials which have been found to be especially useful in the present invention:

| | |
|---|---|
| Zinc chloride | Zinc stearate |
| Zinc oxide | Zinc oleate |
| Zinc carbonate | Zinc 2-ethylhexoate |
| Zinc acetate | Zinc sulfate |
| Zinc laurate | Zinc sulfide |
| Zinc naphthenate | |

The concentration of the compound of zinc may vary from 0.01 part per 1 part of component (*a*) to about 5.0 parts per 1 part of component (*a*).

Component (*c*) of the present invention comprises the hydroxyl and amino-free unsaturated cyclic diketones and the hydroxyl and amino-free alkyl substituted unsaturated cyclic diketones. Anthraquinone, 2-methyl anthraquinone, 2-ethyl anthraquinone and 1,4 naphthaquinone are illustrative of such materials.

The concentration of component (*c*) may vary from about 0.1 part to about 20 parts per 20 parts of component (*a*).

Component (*d*) is the light stabilizing agent of the present invention. It comprises a trivalent cerium compound in combination with resorcinol monobenzoate. These materials when added to the present compositions do not interfere with the passage of actinic light when such compositions are formed into films and exposed. However, shortly after exposure to a strong actinic light the resorcinol monobenzoate converts from a poor screener of ultraviolet light to an extremely efficient screener of ultra-violet radiations. It is our theory that the resorcinol monobenzoate owes its effectiveness to a conversion to dihydroxybenzophenone. This conversion is accomplished by the ultra-violet light source and results in a product opaque to subsequent ultra-violet radiations. Further, when the photosensitive films are heat "developed," the cerous compound (which does not interfere with the passage of ultra-violet radiations) in the presence of air or other oxidizing agents converts to a ceric compound. We have found that the resultant ceric compounds are opaque to ultra-violet radiations. Thus the initial exposure to ultra-violet radiations and the subsequent heat development becomes the means of insuring stability to future light exposure.

Thus we have achieved light stability never before attained.

While any of the trivalent cerium or cerous compounds, such as cerous carbonate, cerous oxalate, cerous fluoride and cerous chloride are usable in the present invention, it will be understood that mixtures of rare earth compounds containing cerous compounds can also be used. It is only necessary to determine the percentage of cerous compound present in the rare earth mixture and then use the amount of rare earth mixture necessary to give the requisite amount of cerous compound.

The ratio of trivalent cerium compound to resorcinol monobenzoate may vary greatly, such as, from about 1:0.01 to about 0.01:1.0. However, the total concentration of the trivalent cerium compound and resorcinol monobenzoate in combination should be from about 0.05 to about 4 parts per 100 parts of component (*a*).

The following examples are given so that the foregoing discussion may be more clearly understood. All of these formulations produced exact positives of the negative which was used to mask the film. The possible combinations of the various components are innumerable and thus it will be remembered that the examples are only illustrative of the many possible ones.

I

| | |
|---|---|
| 100 | grams polyvinyl chloride |
| 2 | grams zinc oxide |
| 2 | grams 1,4 naphthaquinone |
| 0.7 | gram cerous fluoride |
| 0.3 | gram resorcinol monobenzoate |
| 35 | grams di-2-ethyl hexyl phthalate |
| 24 | grams mineral spirits |
| 6 | grams methyl isobutyl ketone |

It will be noted that in the foregoing and subsequent examples, a diluent is used when admixing the ingredients of the photosensitive systems. Depending on the preferred mechanical handling of the film, it may prove desirable to prepare either a plastisol or organosol coating. The diluent is not a necessary part of the photosensitive composition.

The above ingredients were ball milled for 24 hours and the resulting viscous liquid was drawn down as a thin film on a polished aluminum plate. The film was first heated to about 120° F. for about 2 minutes to evaporate the diluent. The film was then heated at 300° F. to 350° F. for about 2 minutes only to solvate the resin with the plasticizer. As with the diluent the plasticizer does not contribute to the photosensitivity of the present compositions. Any of the desirable plasticizers may be used or eliminated depending on the desired rigidity of the film.

The film was then masked with a negative and exposed for about 60 seconds to an ultra-violet light source with an actinic light intensity of about 120 milliwatts per square centimeter of surface. The film was developed by placing in an oven at 320° F. for about 6 minutes.

The optical density of the film was measured immediately after development. The film was then exposed 120 hours to a battery of sun lamps which emit considerable ultra-violet radiation. The mean change in optical density was −0.01 after exposure indicating a very light stable film.

A similar film was made omitting component (*d*). Here the mean change in optical density was −0.30 which shows a fading rate more than fifteen times as great as the film which contained the component (*d*). Thus it becomes apparent that the combination of the trivalent cerium compound resorcinol monobenzoate confers light stability never before obtained.

Similar results were obtained using various other cerous compounds in combination with resorcinol monobenzoate.

Procedures similar to that of Example I were repeated using different resins, such as vinyl chloride ester copolymer, vinyl chloride-vinylidene copolymer resin, polyvinylidene chloride resin, etc. All of the resins worked substantially in the same manner.

The following examples are illustrative of photosensitive compositions containing polymeric materials other than halogenated resins which are able to undergo degradation with the formation of chromophore groups:

II 20 grams cellulose acetate
2 grams anthraquinone
10 grams chlorinated paraffin
5 grams zinc oxide
69 grams butyl acetate
2 grams cerous fluoride
1 gram resorcinol monobenzoate

III 20 grams cellulose acetate
2 grams 1,4 naphthaquinone
10 grams chlorinated paraffin
5 grams zinc oxide
69 grams butyl acetate
1.5 grams cerous fluoride
1.5 grams resorcinol monobenzoate

IV 20 grams alkyd resin
2 grams 2-methyl anthraquinone
5 grams chlorinated paraffin
9 grams zinc naphthenate
60 grams mineral spirits
0.5 gram cerous chloride
0.3 gram resorcinol monobenzoate

V 20 grams alkyd resin
2 grams 1,4 naphthaquinone
5 grams chlorinated paraffin
9 grams zinc naphthenate
60 grams mineral spirits 0.5 gram cerous chloride
1.0 gram resorcinol monobenzoate

VI 20 grams ethyl cellulose
2 grams 1,4 naphthaquinone
20 grams chlorinated paraffin
2 grams zinc oxide
60 grams benzene
0.5 gram cerous carbonate
0.5 gram resorcinol monobenzoate

VII 20 grams polyvinyl acetate
2 grams 1,4 naphthaquinone
20 grams chlorinated paraffin
2 grams zinc oxide
69 grams butyl acetate
0.5 gram cerous fluoride
1.0 gram resorcinol monobenzoate

VIII 50 grams vinyl chloride-vinyl acetate copolymer
35 grams methyl isobutyl ketone
140 grams mineral spirits
1 gram 1,4 naphthaquinone
1 gram zinc oxide
20 grams di-2-ethyl hexyl phthalate
0.25 gram cerous fluoride
0.25 gram resorcinol monobenzoate

IX 50 grams vinyl chloride-vinylidene chloride copolymer
62 grams methyl isobutyl ketone
62 grams toluene
1 gram 1,4 naphthaquinone
1 gram zinc oxide
0.25 gram cerous fluoride
0.25 gram resorcinol monobenzoate The following example illustrates a composition for treating paper. The ingredients after thorough mixing were used to impregnate the paper which was then masked, exposed to actinic light and heat developed. This procedure resulted in an image in the paper.

X 2 grams 1,4 naphthaquinone
20 grams chlorinated paraffin
2 grams zinc oxide
69 grams butyl acetate
0.5 gram cerous fluoride
0.5 gram resorcinol monobenzoate In all of the aforegoing examples we use an exposure of from about 15 seconds to about 2 minutes to an actinic light source of about 120 milliwatts per square centimeter of surface. It is to be understood that this exposure is only illustrative of how the photosensitive systems may be exposed. It is entirely within the contemplation of this invention to produce latent images in our photosensitive systems using an exposure time of one thousandth of a second with an actinic light source on the order of two milliwatts per square centimeter of exposed surface.

The exposure of the photosensitive systems of this invention may be carried out under any source of electromagnetic waves in the range of X-ray up to infra-red.

The development of the latent image may be carried out in a temperature range of from about 200° F. to about 500° F. for about one-half to about 60 minutes.

It is necessary that the several components of the system be thoroughly and uniformly admixed. Several possible methods of accomplishing this are as follows:

(*a*) If the various components are soluble in the system they may be added together and suitably mixed by mechanical agitation.

(*b*) The components if insoluble in the system, may be mixed and ground on a three roll paint mill or other similar type mill.

(*c*) The components may be dissolved in any suitable liquid. If the polymeric material is a resinous film or a cellulosic sheet the solution of the components may then be deposited on the surface thereof and allowed to soak down.

Any finely divided inert solid particles, such as mica, talc, silica, diatomaceous earth and titanium dioxide may be used in amounts varying from about 1% to about 50% of the weight of the polymeric film carrier, as "physical barriers" or "spacers" to improve the production of half-tones in the photosensitive compositions herein disclosed.

Active pigments, such as calcium carbonate, basic lead sulfate, etc. may be used as "chemical spacers" in the aforegoing compositions to improve the production of half-tones. Any halogen acid liberated during development which does not react with the compound of zinc, will be taken up by chemical reaction with calcium carbonate. The "chemical spacers" may be used in the same amounts as the aforegoing "physical spacers."

Other modes of applying the principle of the invention may be employed provided the features stated in any of the following claims or the equivalent of such be employed.

We, therefore, particularly point out and claim as our invention:

1. A photosensitive composition of matter comprising an intimate admixture of: (*a*) 100 parts of at least one material selected from the class consisting of chlorine-containing vinyl resins: and halogen-free resins plus a material having high light instability and a boiling point not less than 150° F. selected from the class consisting of saturated aliphatic branch-chain chlorinated hydrocarbons, halogenated fatty acids, halogenated vegetable oils, chlorine-containing aromatic aldehydes, chlorine-containing olefins and chlorinated styrene compounds; (*b*) from 1.0 part to about 50 parts per 100 parts of component (*a*) of a compound of zinc; (*c*) from .5 part to about 100 parts per 100 parts of component (*a*) of a hydroxyl and amino-free material selected from the class consisting of unsaturated cyclic diketones and alkyl substituted unsaturated cyclic diketones; and (*d*) from about 0.05 part to about 4 parts per 100 parts of component (*a*) of the combination of (1) a trivalent cerium compound and (2) resorcinol monobenzoate, the weight ratio of (1) to (2) being in the range of from about 1:0.01 to about 0.01:1, respectively.

2. A photosensitive composition of matter comprising an intimate admixture of: (*a*) 100 parts of a chlorine-containing vinyl resin; (*b*) from 1.0 part to about 50 parts per 100 parts of component (*a*) of a compound of zinc; (*c*) from .5 part to about 100 parts per 100 parts of component (*a*) of a hydroxyl and amino-free material selected from the class consisting of unsaturated cyclic diketones and alkyl substituted unsaturated cyclic diketones; and (*d*) from about 0.05 part to about 4 parts per 100 parts of component (*a*) of the combination of (1) a trivalent cerium compound and (2) resorcinol monobenzoate, the weight ratio of (1) to (2) being in the range of from about 1:0.01 to about 0.01:1, respectively.

3. A photosensitive composition of matter comprising an intimate admixture of: (*a*) 100 parts of a halogen-free vinyl resin selected from the group consisting of polyvinyl alcohol and polyvinyl acetate; (*b*) from about 0.5 part to about 100 parts per 100 parts of component (*a*) of a material having high light instability and a boiling point not less than 150° F. selected from the class consisting of saturated aliphatic branch-chain chlorinated hydrocarbons, halogenated fatty acids, halogenated vegetable oils, chlorine-containing aromatic aldehydes, chlorine-containing olefins and chlorinated styrene compounds; (*c*) from 1.0 part to about 50 parts per 100 parts of components (*a*) and (*b*) of a compound of zinc; (*d*) from .5 part to about 100 parts per 100 parts of components (*a*) and (*b*) of a hydroxyl and amino-free material selected from the class consisting of unsaturated cyclic diketones and alkyl substituted unsaturated cyclic diketones; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively.

4. A photosensitive composition of matter comprising an intimate admixture of: (*a*) 100 parts of a halogen-free cellulose resin; (*b*) from about .5 part to about 100 parts per 100 parts of component (*a*) of a material having high light instability and a boiling point not less than 150° F. selected from the class consisting of saturated aliphatic branch-chain chlorinated hydrocarbons, halogenated fatty acids, halogenated vegetable oils, chlorine-containing aromatic aldehydes, chlorine-containing olefins and chlorinated styrene compounds; (*c*) from 1.0 part to about 50 parts per 100 parts of components (*a*) and (*b*) of a compound of zinc; (*d*) from .5 part to about 100 parts per 100 parts of components (*a*) and (*b*) of a hydroxyl and an amino-free material selected from the class consisting of unsaturated cyclic diketones and alkyl substituted unsaturated cyclic diketones; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively.

5. A photosensitive composition of matter comprising an intimate admixture of: (*a*) 100 parts of polyvinyl chloride; (*b*) from 1.0 part to about 50 parts per 100 parts of component (*a*) of zinc oxide; (*c*) from .5 part to about 100 parts per 100 parts of component (*a*) of 1,4-naphthaquinone; and (*d*) from about 0.05 part to about 4 parts per 100 parts of component (*a*) of the combination of (1) a trivalent cerium compound and (2) a resorcinol monobenzoate, the weight ratio of (1) to (2) being in the range of from about 1:0.01 to about 0.01:1, respectively.

6. A photosensitive composition of matter comprising an intimate admixture of: (*a*) 100 parts ethyl cellulose; (*b*) from about .5 part to about 100 parts per 100 parts of component (*a*) of chlorinated paraffin; (*c*) from 1.0 part to about 50 parts per 100 parts components (*a*) and (*b*) of zinc oxide; (*d*) from .5 part to about 100 parts per 100 parts of components (*a*) and (*b*) of 1,4-naphthaquinone; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1.0.01 to about 0.01:1, respectively.

7. A photosensitive composition of matter comprising an intimate admixture of: (*a*) 100 parts of polyvinyl acetate; (*b*) from about .5 part to about 100 parts per 100 parts of component (*a*) of chlorinated paraffin; (*c*) from 1.0 part to about 50 parts per 100 parts of components (*a*) and (*b*) of zinc oxide; (*d*) from .5 part to about 100 parts per 100 parts of components (*a*) and (*b*) of 1,4-naphthaquinone; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively.

8. The process of making photographic images which comprises exposing a photosensitive system in such a manner so as to create a light intensity gradient such that the area receiving maximum actinic light is exposed to at least 2 milliwatts per square centimeter for at least one thousandth of a second, said photosensitive system consisting essentially of an intimate admixture of: (*a*) 100 parts of at least one material selected from the class consisting of chlorine-containing vinyl resins; halogen-free resins plus a material having high light instability and a boiling point not less than 150° F. selected from the class consisting of saturated aliphatic branch-chain chlorinated hydrocarbons, halogenated fatty acids, halogenated vegetable oils, chlorine-containing aromatic aldehydes, chlorine-containing olefins and chlorinated styrene compounds; (*b*) from 1.0 part to about 50 parts per 100 parts of component (*a*) of a compound of zinc; (*c*) from .5 part to about 100 parts per 100 parts of component (*a*) of a hydroxyl and amino-free material selected from the class consisting of unsaturated cyclic diketones and alkyl substituted unsaturated cyclic diketones; and (*d*) from about 0.05 part to about 4 parts per 100 parts of component (*a*) of the combination of (1) a trivalent cerium compound and (2) resorcinol monobenzoate, the weight ratio of (1) to (2) being in the range of from about 1:0.01 to about 0.01:1, respectively; and thereafter submitting said system to a temperature of from about 200° F. to about 500° F. for a period of from about ½ minute to about 60 minutes.

9. The process of making photographic images which comprises exposing a photosensitive system in such a manner so as to create a light intensity gradient such that the area receiving maximum actinic light is exposed to at least two milliwatts per square centimeter for at least one thousandth of a second, said photosensitive system consisting essentially of an intimate admixture of: (*a*) 100 parts of a chlorinated vinyl resin; (*b*) from 1.0 part to about 50 parts per 100 parts of component (*a*) of a compound of zinc; (*c*) from 0.5 part to about 100 parts per 100 parts of component (*a*) of a hydroxyl and amino-free material selected from the class consisting of unsaturated cyclic diketones and alkyl substituted unsaturated cyclic diketones; and (*d*) from about 0.05 part to about 4 parts per 100 parts of component (*a*) of the combination of (1) a trivalent cerium compound and (2) resorcinal monobenzoate, the weight ratio of (1) to (2) being in the range of from about 1:0.01 to about 0.01:1, respectively, and thereafter submitting said system to a temperature of from about 200° F. to about 500° F. for a period of from about ½ to about 60 minutes.

10. The process of making photographic images which comprises exposing a photosensitive system in such a manner so as to create a light intensity gradient such that the area receiving maximum actinic light is exposed to at least two milliwatts per square centimeter for at least one thousandth of a second, said photosensitive system consisting essentially of an intimate admixture of: (*a*) 100 parts of a halogen-free resin; (*b*) from about .5 part to about 100 parts per 100 parts of component (*a*) of a material having high light instability and a boiling point not less than 150° F. selected from the class consisting of saturated aliphatic branch-chain chlorinated hydrocarbons, halogenated fatty acids, halogenated vegetable oils, chlorine-containing aromatic aldehydes, chlorine-containing olefins and chlorinated styrene compounds; (*c*) from 1.0 parts to about 50 parts per 100 parts of components (*a*) and (*b*); (*d*) from .5 part to about 100 parts per 100 parts of components (*a*) and (*b*) of a hydroxyl and amino-free material selected from the class consisting of unsaturated cyclic diketones and alkyl substituted unsaturated cyclic diketones; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively, and thereafter submitting said system to a temperature of from about 200° F. to about 500° F. for a period of from about ½ minute to about 60 minutes.

11. The process of making photographic images which comprises exposing a photosensitive system in such a manner so as to create a light intensity gradient such that the area receiving maximum actinic light is exposed to at least two milliwatts per square centimeter for at least one thousandth of a second, said photosensitive system consisting essentially of an intimate admixture of: (*a*) 100 parts of a halogen-free cellulose resin; (*b*) from about .5 part to about 100 parts per 100 parts of component (*a*) of a material having high light instability and a boiling point not less than 150° F. selected from the class consisting of saturated aliphatic branch-chain chlorinated hydrocarbons, halogenated fatty acids, halogenated vegetable oils, chlorine-containing aromatic aldehydes, chlorine-containing olefins and chlorinated styrene compounds; (*c*) from 1.0 part to about 50 parts per 100 parts of components (*a*) and (*b*) of a compound of zinc; (*d*) from .5 part to about 100 parts per 100 parts of components (*a*) and (*b*) of a hydroxyl and amino-free material selected from the class consisting of unsaturated cyclic diketones and alkyl substituted unsaturated cyclic diketones; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively, thereafter submitting said system to a temperature of from about 200° F. to about 500° F. for a period of from about ½ minute to about 60 minutes.

12. The process of making photographic images which comprises exposing a photosensitive system in such a manner so as to create a light intensity gradient such that the area receiving maximum actinic light is exposed to at least two milliwatts per square centimeter for at least one thousandth of a second, said photosensitive system consisting essentially of an intimate admixture of: (*a*) 100 parts of polyvinyl chloride; (*b*) from 1.0 part to about 50 parts per 100 parts of component (*a*) of zinc oxide; (*c*) from .5 part to about 100 parts per 100 parts of component (*a*) of 1,4-naphthaquinone; and (*d*) from about 0.05 part to about 4 parts per 100 parts of component (*a*) of the combination of (1) a trivalent cerium compound and (2) resorcinol monobenzoate, the weight ratio of (1) to (2) being in the range of from about 1:0.01 to about 0.01:1, respectively, and thereafter submitting said system to a temperature of about 200° F. to about 500° F. for a period of from about ½ to about 60 minutes.

13. The process of making photographic images which comprises exposing a photosensitive system in such a manner so as to create a light intensity gradient such that the area receiving maximum actinic light is exposed to at least two milliwatts per square centimeter for at least one thousandth of a second, said photosensitive system consisting essentially of an intimate admixture of: (*a*) 100 parts ethyl cellulose; (*b*) from about .5 parts to about 100 parts per 100 parts of component (*a*) of chlorinated paraffin; (*c*) from 1.0 part to about 50 parts per 100 parts of components (*a*) and (*b*) of zinc oxide; (*d*) from .5 part to about 100 parts per 100 parts of components (*a*) and (*b*) of 1,4-naphthaquinone; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively, and thereafter submitting said system to a temperature of from about 200° F. to about 500° F. for a period of from about ½ minute to about 60 minutes.

14. The process of making photographic images which comprises exposing a photosensitive system in such a manner so as to create a light intensity gradient such that the area receiving maximum actinic light is exposed to at least two milliwatts per square centimeter for at least one thousandth of a second, said photosensitive system consisting essentially of an intimate admixture of: (*a*) 100 parts of polyvinyl acetate; (*b*) from about .5 part to about 100 parts per 100 parts of component (*a*) of chlorinated paraffin; (*c*) from 1.0 part to about 50 parts per 100 parts of components (*a*) and (*b*) of zinc oxide; (*d*) from .5 part to about 100 parts per 100 parts of components (*a*) and (*b*) of 1,4-naphthaquinone; and (*e*) from about 0.05 part to about 4 parts per 100 parts of components (*a*) and (*b*) of the combination of (1) a trivalent cerium compound and (2) resorcinol monobenzoate, the weight ratio of (1) to (2) being in the range of from about 1:0.01 to about 0.01:1, respectively, and thereafter submitting said system to a temperature of from about 200° F. to about 500° F. for a period of from about ½ minute to about 60 minutes.

References Cited in the file of this patent

UNITED STATES PATENTS

| | | |
|---|---|---|
| 2,592,311 | Meyer et al. | Apr. 8, 1952 |
| 2,712,996 | Elliot | July 12, 1955 |
| 2,754,210 | Elliot | July 10, 1956 |

FOREIGN PATENTS

| | | |
|---|---|---|
| 121,692 | Australia | July 18, 1946 |